United States Patent [19]

Katagiri et al.

[11] 4,431,608
[45] Feb. 14, 1984

[54] GAS PURIFICATION SYSTEM

[75] Inventors: Katsuo Katagiri, Nara; Kiyotaka Shimazu, Higashiosaka, both of Japan

[73] Assignee: Osaka Gas Company, Osaka, Japan

[21] Appl. No.: 448,104

[22] Filed: Dec. 9, 1982

Related U.S. Application Data

[62] Division of Ser. No. 254,558, Apr. 15, 1981, Pat. No. 4,375,450.

[51] Int. Cl.³ .............................................. B01D 50/00
[52] U.S. Cl. ..................................... 422/170; 55/196; 55/228; 55/53; 202/270; 423/234; 423/236; 423/238; 423/573 R
[58] Field of Search ...................... 55/46–48, 55/52–54, 56, 68, 70, 71, 73, 85, 89, 196, 228; 423/234, 233, 236, 238, 573 R; 422/170; 201/28–30; 202/270

[56] References Cited

U.S. PATENT DOCUMENTS

| | | | |
|---|---|---|---|
| 2,288,176 | 6/1942 | Baehr | 55/70 |
| 2,756,841 | 7/1956 | Asendorf | 55/68 |
| 3,020,138 | 2/1962 | Wethly | 55/70 |
| 3,104,959 | 9/1963 | Grosskinsky | 55/70 |
| 3,248,855 | 5/1966 | Hartmann | 55/48 |
| 3,885,930 | 5/1975 | Scheerer | 55/196 |
| 3,920,419 | 11/1975 | Schroeder | 55/70 |
| 4,248,608 | 2/1981 | Giammarco et al. | 55/73 |

FOREIGN PATENT DOCUMENTS

| | | | |
|---|---|---|---|
| 1494814 | 6/1969 | Fed. Rep. of Germany | 423/236 |
| 244341 | 3/1970 | U.S.S.R. | 55/196 |

Primary Examiner—Bernard Nozick
Attorney, Agent, or Firm—Edwin E. Greigg

[57] ABSTRACT

A gas purification system has: a first treatment apparatus, which purifies an untreated feed gas, containing toxic ingredients such as HCN gas, $H_2S$ gas and $NH_3$ gas, into a primary treated gas by causing the feed gas to contact with an alkaline absorbent liquid; an absorbent-liquid-resuscitation apparatus, which refreshes the absorbent liquid, after absorbing the toxic ingredients, by bubblingly introducing a resuscitation gas; and a second treatment apparatus, which further purifies the primary treated gas into a secondary treated gas by strippingly capturing any possible remnant $NH_3$ gas still present in the former. The resuscitation gas and the toxic-ingredient-absorbed absorbent liquid are forcibly converged by premix nozzles into combined gas/liquid jets as are injected into the absorbent-liquid-resuscitation apparatus. The primary treated gas and the gas coming from the resuscitation apparatus as its effluent waste are commingled and the resultant mixed gas is then fed into and treated within the second treatment apparatus.

1 Claim, 4 Drawing Figures

GAS PURIFICATION SYSTEM

This is a division of application Ser. No. 254,558, filed Apr. 15, 1981 now U.S. Pat. No. 4,375,450.

BACKGROUND OF THE INVENTION (1) Field of the Invention

This invention relates to a gas purification system comprising: a first treatment apparatus adapted to purify an untreated feed gas into a primary treated gas by introducing the untreated gas through a feed conduit for herein causing same to contact with an alkaline absorbent liquid so that soluble ingredients in the untreated gas, particularly HCN gas, $H_2S$ gas the $NH_3$ gas, are absorbed in the absorbent liquid; an absorbent-liquid-resuscitation apparatus adapted to refresh the used absorbent liquid fed from the said first treatment apparatus as bottom effluent thereof containing the soluble gases, by bubblingly introducing herein a resuscitation gas, containing $O_2$ gas, while purging out waste or effluent gas herefrom, and to feed back the thusly refreshed absorbent liquid into the first treatment apparatus; and a second treatment apparatus adapted to further purify the said primary treated gas into a secondary treated gas by introducing the primary treated gas fed from the said first treatment apparatus as top effluent thereof, through a feed conduit for herein strippingly capturing any possible remnant $NH_3$ gas still present therein.

(2) Description of the Prior Art

The system as mentioned hereinabove is supposed to deal with the untreated feed gas such for instance as the fuel gas obtained by coal carbonization, as contains therein toxic ingredients such as HCN gas, $H_2S$ gas and $NH_3$ gas, which will thus cause public nuisance when emitted into the atmospheric air and/or aqueous system; namely to purify such feed gas, or more specifically to remove the toxic ingredients from same to ultimately result in a harmless gas as will incur no public nuisance any more; and the conventional system of such type is visualized by a flow diagram as shown in FIG. 4, but there still remains much to be improved in such conventional system. Thus, the system, having been in the construction adopting separate individual nozzles (20a), (20b)—respectively for the bottom effluent of the absorbent liquid from the first treatment apparatus (5), containing the soluble gases, and for air, as used here as the resuscitation gas—for feeding them to absorbent liquid accommodated within the absorbent-liquid-resuscitation apparatus (9), has resulted in rather poor gas/liquid contact efficiency in the resuscitation apparatus (9), requiring therefore big amount of the air in order to resuscitate the absorbent liquid sufficiently enough, consequently incurring uprise in both the installation cost and the operation cost for such air supply, followed by another inconvenience of accordingly increasing the waste effluent gas from the resuscitation apparatus (9), and yet further making it necessary to properly treat such waste effluent gas with an additional separate apparatus (21)—other than the second treatment apparatus (12) for stripping the primary treated gas, from the first treatment apparatus (5), of $NH_3$—in view that such waste effluent gas contains therein, as remnant ingredients, $NH_3$ gas and slight amount of $H_2S$ gas, as well as substantial amount of $O_2$ gas, and such system has therefore been disadvantageous in the viewpoint of its initial installation and its running administration, as well.

SUMMARY OF THE INVENTION

This invention is made in view of the actual status as above, and has as its object to improve the gas purification system to have sufficient ability of stripping off the toxic ingredients and high degree of security, yet with its structure rather simpler than has conventionally been as to thus enable to make up the overall system quite compact in size, which thus quite sufficiently realizes the said stripping off of the toxic ingredients with reduced costs of the initial installation and of the running operation, and of which the administration is quite easy and safe.

In order to attain the object, the gas purification system according to this invention is characterized in that in the said absorbent-liquid-resuscitation apparatus there is provided at least one premix nozzle for forcibly converging the said resuscitation gas and the said used absorbent liquid containing the soluble gases, into a combined gas/liquid jetting as is injected into the absorbent liquid retained herein under treatment, and that the said second treatment apparatus is adapted to receive, as the incoming feed therefor, a mixed gas consisting of both the said primary treated gas fed from the first treatment apparatus and the said waste gas from the said absorbent-liquid-resuscitation apparatus.

Thus, by supplying the absorbent liquid and the $O_2$-gas containing resuscitation gas to the resuscitation apparatus by means of the premix nozzle, the efficiency of intimate contact of the absorbent liquid and $O_2$ gas with each other is quite conspicuously enhanced, thereby remarkably reducing the volume of the $O_2$ gas supply to the resuscitation apparatus, as is required for guaranteeing the absorbent-liquid resuscitation to the sufficient degree as desired, and accordingly remarkably reducing the cost charges in view of the initial installation and running operation for the required $O_2$ gas supply to the resuscitation apparatus.

Furthermore, the system advantageously makes use of the fact that the waste gas discharged as effluent from the resuscitation apparatus is remarkably reduced also in accordance with the reduction of the supply gas to the resuscitation apparatus as mentioned above and that on account of the highly effective contact of the absorbent liquid and $O_2$ gas again as mentioned above it can further be said with respect to the waste effluent gas from the resuscitation apparatus that $H_2S$ content is nil at all or quite close thereto and $O_2$ gas concentration is also remarkably reduced; thus for realizing the treatment of such waste effluent gas from the resuscitation apparatus first convergingly commingling same with the primary treated gas coming from the first treatment apparatus; this contributing to make simple and compact the overall entirety of the purification system, accordingly to make same further advantageous both in the monetary and labor viewpoints, effectively avoiding the problems of worstening in the toxic-ingredient stripping ability and/or of accidental burning of any possible combustible treated gas.

BRIEF DESCRIPTION OF THE DRAWINGS

FIG. 1 is a schematic flow sheet chart of an embodiment, FIG. 2 is a sectional view of a portion thereof essential to this invention and FIG. 3 is a chart, similar to FIG. 1, of another embodiment;

while

DETAILED DESCRIPTION OF THE PREFERRED EMBODIMENTS

Figure 1:
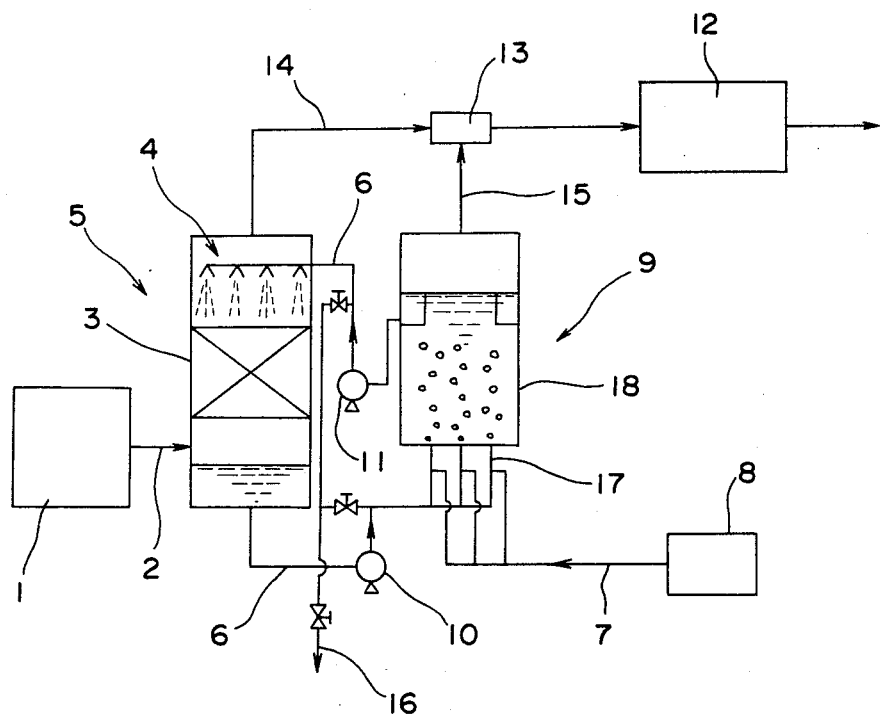
FIGS. 1–3 of the drawings show, by way of example, a couple of embodiments of the gas purification system according to this invention, more particularly

This invention will now be described in more detail hereunder with respect to the embodiments shown in the drawings:

A block (1) in FIG. 1 is supposed to be a coal carbonization oven, from which untreated feed fuel gas is supplied through a feed conduit (2) to an apparatus made substantially of a closed column (3) within which the gas is caused to flow upwards in counter-flow intimate contact with an alkaline absorbent liquid supplied through spraying means (4) provided therewithin, the apparatus being referred to generally as a first treatment apparatus (5). The counter-flow contact causes substantially the entire amount of HCN gas and $H_2S$ gas and also some portion of $NH_3$ gas, as well as other gases of the possible further ingredients such for instance as benzene, toluene, xylene and so forth, contained in the said fuel gas, to be strippingly absorbed in the absorbent liquid. There is provided—as is connected with the first treatment apparatus (5) via recirculation conduit means (6) and with an air compressor (8) via supply means (7) of the air to function as the resuscitation gas—an absorbent-liquid-resuscitation apparatus (9). The absorbent liquid coming as bottom effluent from the first treatment apparatus (5) as driven by a pump (10), containing therein the soluble gases as absorbed, is thus caused within the resuscitation apparatus (9) to contact with the air so that $H_2S$ in the absorbent liquid may thereby be oxidized to liberate free sulfur and to precipitate same, while the thusly resuscitated absorbent liquid is then recirculated to said spraying means (4) by a pump (11). By a block (12) is meant a second treatment apparatus for herein strippingly capturing $NH_3$ gas, and a mixer (13) is provided in a primary-treated-gas feed conduit (14) via which a top portion of the first treatment apparatus (5) and this second treatment apparatus are connected with each other, while a waste-resuscitation-gas conduit (15) is provided for connecting a top portion of the resuscitation apparatus (9) and the mixer (13) with each other via same, to thus commingle the waste effluent resuscitation gas coming from the resuscitation apparatus (9) with the primary treated gas coming from the first treatment apparatus (5), the resultant mixed gas being then stripped of $NH_3$, remnantly present therein, by being bubblingly introduced into a sulfuric acid solution accommodated within the second treatment apparatus (12). There is further provided, as connected to said recirculation conduit means (6), discharge conduit means (16) as properly valved for arbitrarily discharging the absorbent liquid, when $NH_4SCN$ concentration has substantially augmented, as well as the librerated free sulfur.

Figure 2:
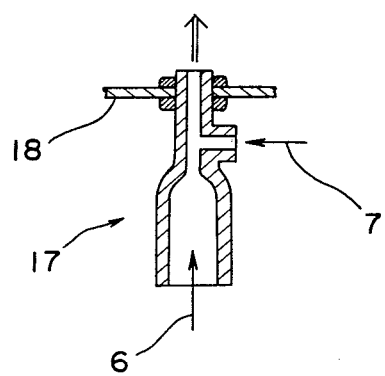

As shown in FIG. 2, said recirculation conduit means (6), for supplying the absorbent liquid from the first treatment apparatus (5) to the resuscitation apparatus (9), and said supply means (7), of the air for the resuscitation, are constructed in communication with a plurality of premix nozzles (17) provided in the resuscitation apparatus (9), so that the absorbent liquid and the air may thus be forcibly converged into a combined gas-/liquid jetting as is then injected into the absorbent liquid retained in a closed column (18) for the resuscitation.

This construction contributes to highly effective resuscitation of the absorbent liquid with comparatively small amount of the air supply.

Figure 3:
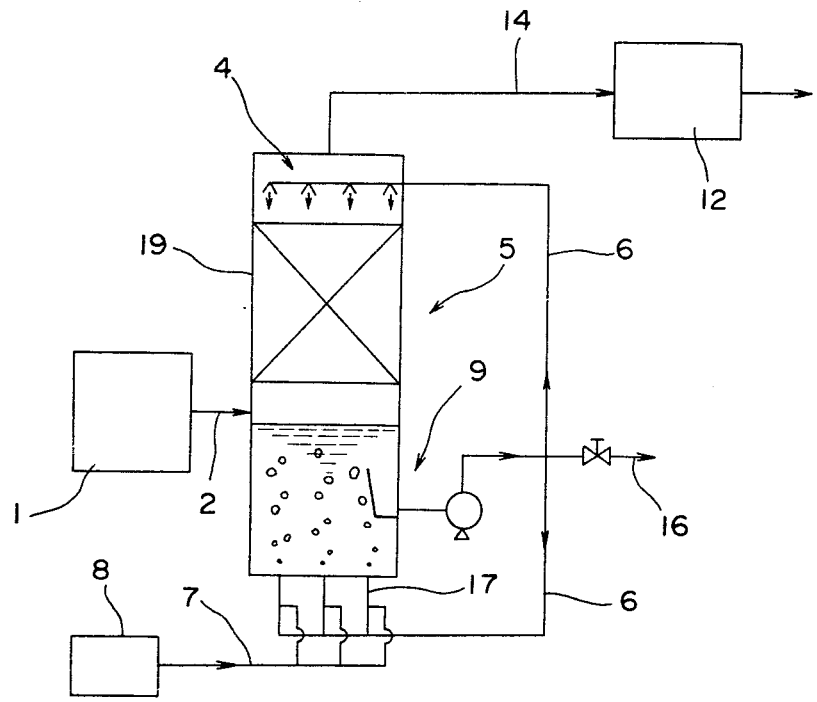
Figure 4:
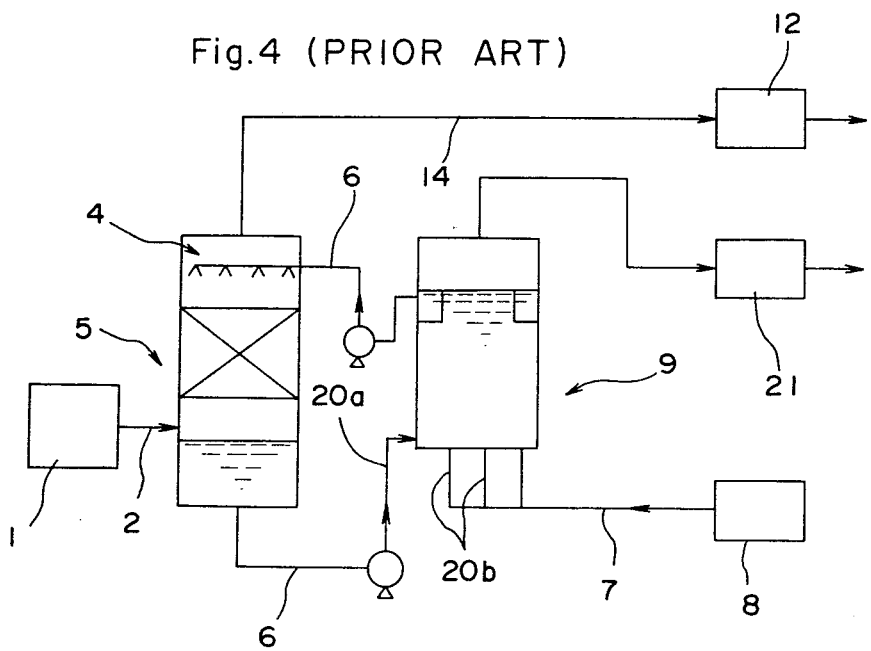
FIG. 4 shows a similar chart of the conventional system.

By the way, the first treatment apparatus (5) and the resuscitation apparatus (9) may as well be constructed in a modified form as illustrated in FIG. 3, in which there is provided a common closed column (19) and there are connected, in communication with the interior thereof, the said feed conduit (2) from the coal carbonization oven (1) in a vertically intermediate portion of the column, the said primary-treated-gas feed conduit (14), connected to the said $NH_3$-stripper apparatus (12), in a top portion of the column, and the said premix nozzles (17) each in a bottom portion of the column; with further provision of recirculation conduits (6), (6), for pumping the abosorbent liquid, retained in a lower portion within the column (19), to said spraying means (4) provided in this instance in an upper portion within the column (19) and to the said premix nozzles (17); thus the upper section of the column (19) functioning as the first treatment apparatus (5) and the lower section of the column (19) functioning as the resuscitation apparatus (9). This construction has the advantages of reducing the installation area requirement for the gas purification system in its overall entirety, of dispensing with the mixer (13) mentioned hereinbefore and of simplifying the conduit piping construction.

The feed gas to be treated with the system according to this invention is primarily supposed to be the fuel gas as is obtained by coal carbonization, as was mentioned hereinbefore, but it is obvious that this system may as well be applied to stripping off any other gas—destined to various purpose of use—of HCN gas, $H_2S$ gas and $NH_3$ gas.

Practical examples of the said alkaline absorbent liquid are ammonia water, caustic soda solution and the like, or any such solution with further addition therein of any proper redox catalyst.

For supplying $O_2$ gas to the said resuscitation apparatus (9), it is normal and practical to use atmospheric air in the economical viewpoint but it is as well possible to use any $O_2$-containing gas, such for instance as $O_2$-enriched gas.

Various modifications are possible regarding how specifically to design the said premix nozzle (17), and it is preferable to select the construction enableing as minute atomization as possible in bubbling the gas containing $O_2$ for the resuscitation.

To end up, an actual data-comparison result of the functions of a system according to this invention and of a conventional system is now shown hereunder:

Supposing the case of treating a gas, having $H_2S$ concentration of 6 $g/Nm^3$, at a rate of 36,000 $Nm^3/hr$, it has been found that the rate of air supply required for actually converting entire amount of such $H_2S$ to liberated free sulfur is 2,500 $Nm^3/hr$ with the conventional system and is 600 $Nm^3/hr$ with the system of this invention, and that the waste effluent gas from the resuscitation apparatus has the $O_2$-gas concentration of 17.3% in volume with the conventional system and of 5.0% in volume with the system of this invention. Thus, by using the system according to this invention, the required air supply to the resuscitation apparatus is reduced to be less than a quarter of that with the conventional system and the total sum of the effluent gases from the first treatment apparatus and the resuscitation apparatus is reduced by about 30% in comparison with the conventional system, thereby making it possible to substantially reduce the initial installation cost by minimizing the overall equipment and also to comparatively reduce the running operation cost from saving the driving power cost as required for the gas transfer. Actual calculation has revealed, on the basis of the data mentioned hereinabove for treating the gas at the said rate, that the electric power charges required to drive the compressor for the air supply, the pumps for the absorbent-liquid recirculation and so forth, will show a saving, when using the system of this invention in comparison with the case when using the conventional system, in such a big amount of approximately 24,000,000- per year. It should still further be noted that with the conventional system, where the waste effluent gas from the resuscitation apparatus has such high $O_2$ gas concentration as 17.3% in volume as already mentioned, there is a possible danger, if the primary treated gas coming from the first treatment apparatus is anyway combustible, of then causing accidental local burning subsequent to the commingling of such primary treated gas and waste effluent gas from the resuscitation apparatus; but with the system of this invention, where the waste effluent gas has quite low an $O_2$ gas concentration, such phenomenon of the local burning will effectively be eliminated, thus to make it very advantageous in the viewpoint of the safety as well.

We claim:

1. A system for purifying coal carbonization product gas containing NCN gas, $H_2S$ gas and $NH_3$ gas comprising a closed chamber, a first treatment means secured in an upper portion of said closed chamber, an absorbent liquid resuscitation means secured in a lower portion of said closed chamber and spaced from said first treatment means, means for feeding a coal carbonization product gas into said closed chamber in an area between said first treatment means and said absorbent liquid resuscitation means, a plurality of premix nozzles secured to said closed chamber at its bottom, a compressor connected to said premix nozzles to supply oxygen to said resuscitation means, spray means mounted in an upper portion of said closed chamber above said first treatment means, pump means connected via a supply line to a side of said closed chamber in an area including said resuscitation means, means connecting said spray means to said pump supply line which feeds an absorbent liquid resuscitated in said resuscitation means to said spray means, circulation pipe means secured to said pump supply line and to said premix nozzles which mixes an absorbent liquid with the oxygen from said air compressor before admission into said resuscitation means via said premix nozzles, a second treatment means connected to a top portion of said closed chamber above said first treatment means through a supply conduit means, said second treatment means being adapted to remove $NH_3$ gas remaining in the coal carbonization gas directed from said first treatment means, said premix nozzle means is in a form of a nozzle including therein a resuscitation gas passage joining an absorbent liquid passage, whereby the resuscitation gas is mixed into the absorbent liquid in fine bubbles prior to entry into said resuscitation means, and whereby the resuscitation gas discharged from said resuscitation means disposed below said first treatment means mixes with the coal carbonization gas and is delivered via said first treatment means with the coal carbonization product gas discharged therefrom through said supply conduit means to said second treatment means.

* * * * *